May 6, 1952        P. CORSENTINO        2,595,336
POWER TRANSMISSION MECHANISM FOR FARM IMPLEMENTS
Filed Feb. 9, 1948        2 SHEETS—SHEET 1
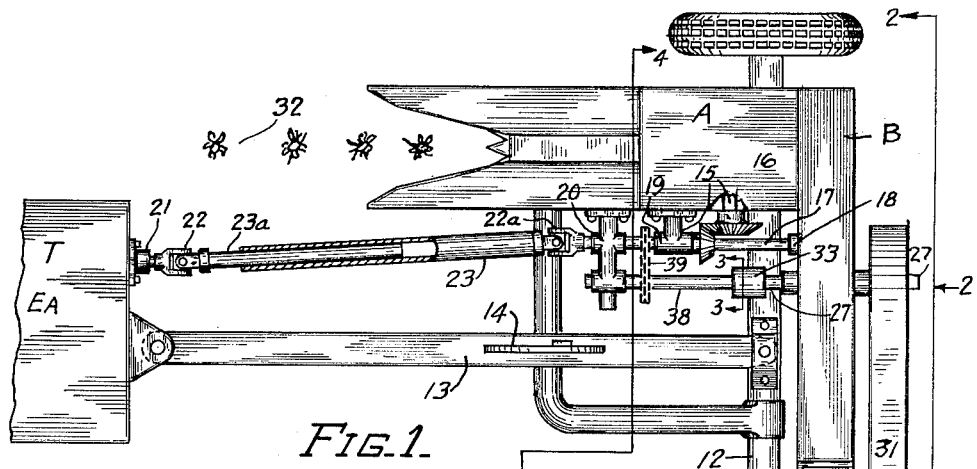
FIG. 1.
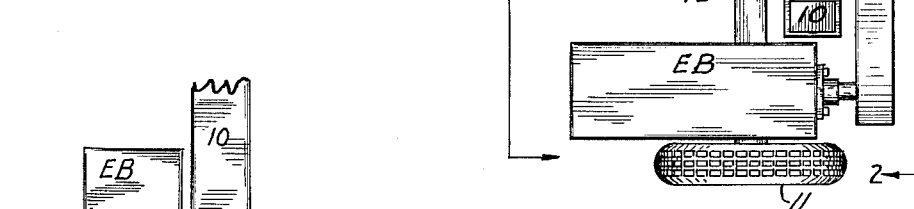
FIG. 2.
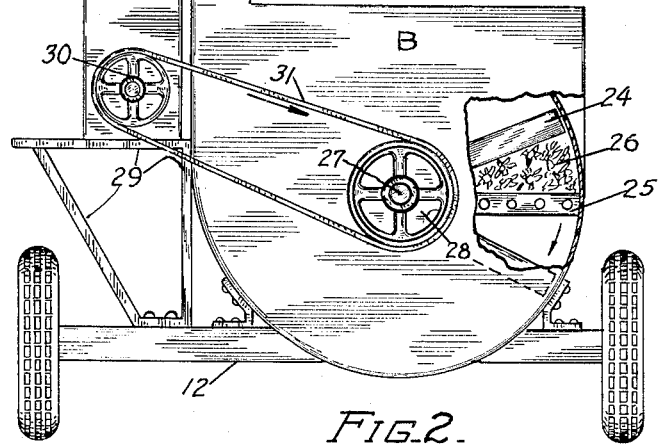
FIG. 3.
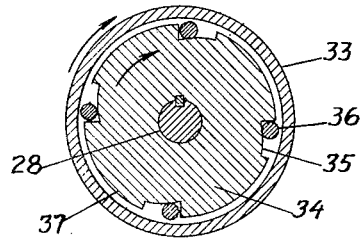
INVENTOR.
PETE CORSENTINO
BY
Martin E. Anderson
ATTORNEY INVENTOR.
PETE CORSENTINO
BY Martin E. Anderson
ATTORNEY Patented May 6, 1952

2,595,336

UNITED STATES PATENT OFFICE 2,595,336

POWER TRANSMISSION MECHANISM FOR FARM IMPLEMENTS

Pete Corsentino, Longmont, Colo.

Application February 9, 1948, Serial No. 7,081

3 Claims. (Cl. 56—10)

This invention relates to improvements in power transmissions and has reference more particularly to a power transmission mechanism intended for use in connection with machines of the type in which there are two machines cooperatively interconnected but independently operable.

Although this invention relates broadly to a power transmission means of the general type above indicated, it will be explained in the following specification as applied more particularly to farm equipments, the specific machine that will be used for illustrating being a hay and/or ensilage cutter.

There is on the market today a machine employed for chopping hay and cornstalks to produce ensilage. This machine has an elevating mechanism and a chopping mechanism that cooperate to gather the material from the field, to chop the same and to convey it by means of a blast of air to a truck for transportation to the place of storage.

Such machines have heretofore been constructed in such a manner that they are pulled over the field by means of a tractor and the mechanism is operated by power from the tractor.

It has been found that the power required for operating such machines, especially in heavy crops of corn where the corn is mixed with grass and weeds, is more than the tractor can provide and it has therefore been suggested that the machinery shall be operated by a separate engine carried by the machine, the tractor serving merely as a means for moving the machine over the ground and for steering the same.

It has been found from actual practice that unless the engine provided for operating the machine is greatly oversize for normal operation, it will not handle heavy crops, especially where these are mixed with weeds and grass, as above mentioned.

Since the tractors are provided with engines having a great deal more power than that necessary for pulling such a machine, it is evident that the tractor engine contains a surplusage that can be employed in connection with the harvesting or ensilage machine.

It is the object of this invention, when used in connection with such ensilage cutting machines, to produce a machine in which a part of the machine is operated by power from the tractor and another part by power from an independent engine carried by the machine. The independent engine is connected with the machine so as to operate the cutting mechanism and the blower, as these require the greatest amount of power and are the parts of the machine that cause the slowdown if sufficient power is not available. Where the auxiliary engine is not greatly oversize, it slows down in heavy crops mixed with grass and weeds, as above indicated, and when this occurs it becomes necessary to slow down the speed at which the machine is moved over the field.

It is the object of this invention to produce a power transmission mechanism of such construction and design that when the auxiliary engine slows down due to an excessive load, power from the power takeoff of the tractor will automatically be connected with the machine operated by the auxiliary engine so as to assist the latter in operating the cutter and blower mechanism.

In order to explain this invention so that it may be clearly understood, reference will now be had to the accompanying drawings in which the invention has been illustrated as applied to an ensilage machine of the type above mentioned and in which it has also been illustrated in a general way.

In the drawing:

Figure 1 is a top plan view of an ensilage cutting machine showing the essential elements thereof;

Figure 2 is an end view looking in the direction of arrows 2—2, Figure 1;

Figure 3 is a section through the one-way clutch that connects the two power shafts;

Figure 4:
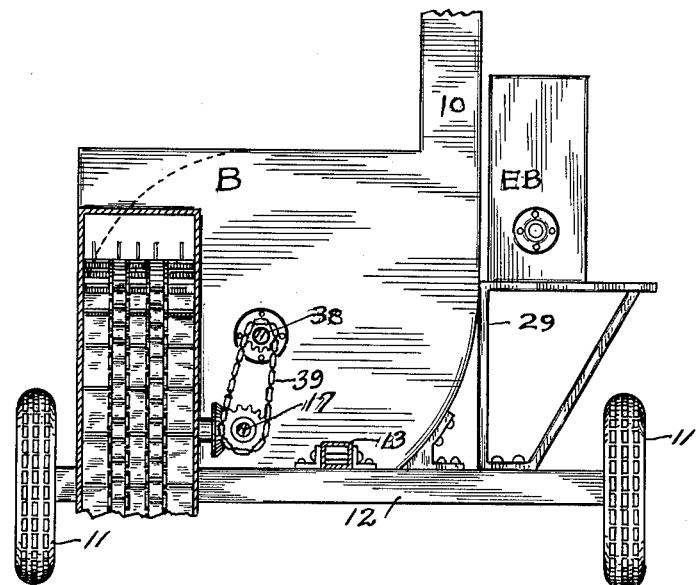
Figure 4 is a view partly in section taken on line 4—4, Figure 1.

In the drawing the tractor has been designated by reference character T and has also had applied thereto the letters EA, meaning thereby the engine for machine A. The two machines have been designated in their entirety by reference characters A and B. Machine A is that part of the ensilage machine that cuts and elevates the corn stalks into the ensilage cutter when the machine is used for harvesting corn or the like, or which elevates the hay into the cutter, if it used for chopping hay. The machine designated by B comprises the cutter blades and the fan. The engine that has been shown as connected with machine B has been designated by EB. That part of the machine designated by reference numeral 10 is the spout through which the cut fodder or ensilage is delivered to the farmer's truck in the usual manner. The machine comprising the two parts A and B is mounted on a truck whose wheels have been designated by reference numerals 11. The axle has been designated by reference numeral 12. A drawbar 13 connects the machine to the tractor. This is provided with the usual tilting mechanism that has not been shown in detail, but has been indicated in a general way and designated by reference numeral 14. Since this invention does not relate to the details of the mechanism but only to the means by which power is transmitted to the machine, the drawing has been limited to the parts that are believed to be necessary for a proper understanding of the invention. The mechanism in machine A is operated through a shaft 15, the outer end of which carries a bevel gear 16. Drive shaft 17 is journalled in bearings 18, 19 and 20. The power take-off of the tractor has been designated in a general way by reference numeral 21 and comprises a universal 22 and a torque shaft 23. This shaft is preferably made of two parts that are telescopically interconnected, the outer part having been designated by 23a. This telescopic connection is essential when the parts are arranged as shown in the drawing, but may be dispensed with if different designs are used. The rear end of torque shaft 23 is connected by means of another universal 22a with the forward end of shaft 17. It is now evident that the tractor, in addition to pulling the machine, also operates the mechanism of machine A. The machine designated by B contains, as above indicated, the rotating cutter blades which are also so constructed that they serve as fan blades. One of these blades have been shown in a general way in Figure 2 by reference numeral 24. The shear plate that is held stationary has been designated by reference numeral 25, while reference numeral 26 designates the hay or other fodder that is being fed to the cutter. The blades move in a clockwise direction, when viewed as in Figure 2, thereby producing a blast of air that drives the cut fodder upwardly through discharge pipe 10. The fan and cutter of machine B is mounted on shaft 27 to the rear end of which a pulley has been attached as shown in Figure 2 of the drawing. A support like that indicated by reference numeral 29 is attached to the machine at one side of the fan housing and carries the motor EB. This motor has a drive shaft that carries a pulley 30. Power is transmitted from this pulley to pulley 28 by means of a belt 31. When the machine operates as a row cutting machine, for example, when it is used for cutting corn stalks into ensilage, it is drawn along the row, the latter having been indicated in a general way by reference numeral 32. The cornstalk is fed to the ensilage cutting mechanism shown in Figure 2 and chopped to the desired fineness in the usual manner. When the corn is mixed with grass and weeds, or where the crop is very heavy, it has been found that the power from engine EB is not sufficient to keep the fan and cutting mechanism rotating at the proper speed, and it has heretofore been necessary, in such cases, to reduce the speed at which the machine travels over the ground. It is evident that since the tractor or engine EA has an excess amount of power, the slowing down of the speed would not become necessary if some of this power could be connected with the fan and cutting mechanism that usually operate independently from engine EB. The invention to which this application refers is primarily directed to means for automatically making such power connection whenever necessary.

Referring now to Figure 1, shaft 27 has been shown as extending entirely through the fan housing and has its forward end connected with one part of a one-way clutch, which has been identified by reference numeral 33.

Referring now to Figure 3 which shows a cross section of one form of a one-way clutch, it will be seen that shaft 27 is connected with the clutch member 34 and that this clutch member has a number of notches 35, whose bottoms are outwardly ranging in clockwise direction, when viewed as in Figure 3. Steel rollers 36 rest in the notches. An outer cylindrical housing 37 is non-rotatably connected with shaft 38. The parts are so proportioned that when the rollers are in the deep end of the notches, the two parts of the clutch can rotate independently. They must, however, rotate in the same direction; so long as member 34 rotates faster than member 37 the clutch will not operate, but if member 34 slows down to a speed less than that at which shaft 38 and member 37 rotate, the clutch will become effective to transmit power from member 37 to member 34. Shaft 38 has been shown as connected with shaft 17 by means of a sprocket chain 39. It is now evident that if the parts are so designed and arranged that shaft 27 will normally rotate at a higher speed than shaft 38, the two machines A and B will be operated independently of each other by their respective motors. If, as often happens, the condition of the crop is such that it blows down the operation of the fan and cutter to a point where clutch member 37 rotates at a higher speed than clutch member 34, the clutch will become operative for the purpose of transmitting power from the tractor engine to machine B, thus making it unnecessary to change the speed at which the machine is moved over the ground.

Figure 5:
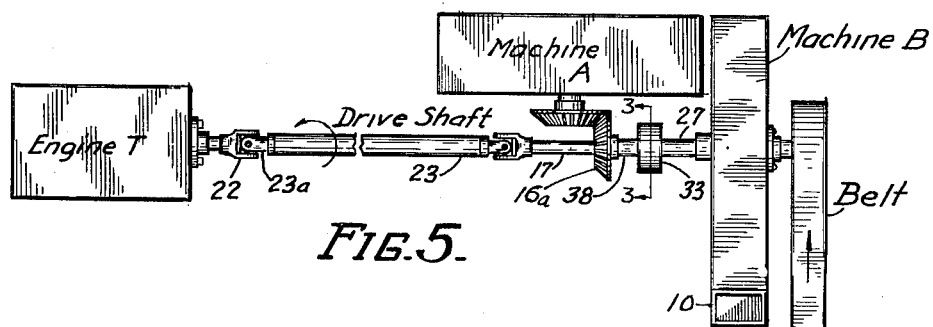
Figure 5 is a top plan view of a diagrammatic embodiment of the invention.

Referring now to Figure 5 of the drawing, the several machines and engines have been shown in a diagrammatic way, interconnected so as to obtain the results above described. The parts have been given the same reference numerals as those in Figure 1. Since the one-way clutch has two members, each connected with an independent shaft and is so constructed that the two shafts must be in alignment, the short section of shaft designated by reference numeral 38 may be considered a separate power shaft. Of course it is immaterial whether shaft 38 is rotated by a sprocket chain 39, or by means of the bevel gears 16 and 16a. It is clear from Figure 5 that so long as shaft 27 rotates faster than shaft 38 the clutch will be inoperative, but as soon as shaft 27 slows down to a speed less than the speed of shaft 28, the clutch will become effective as above described.

Figure 6:
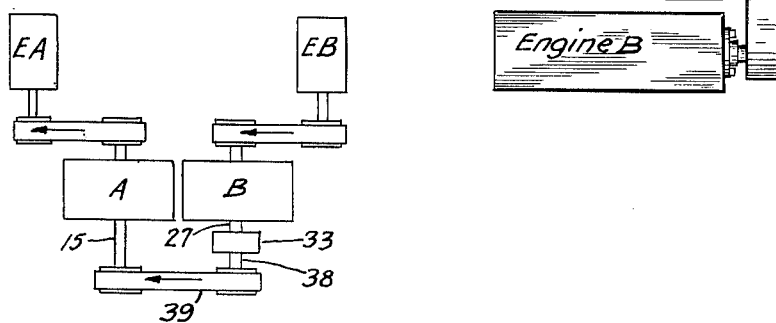
Figure 6 is a view showing another embodiment thereof.

In Figure 6 a slightly modified form of the invention has been illustrated for the purpose of showing that the invention may be embodied in specifically different constructions. The machines A and B may be any two machines and are preferably machines that cooperate to perform some desired function. In this figure the machines have each been shown as driven by a separate engine through belts. The one-way clutch is shown as secured to the rear end of shaft 27 and connects the latter shaft with shaft 38. Power from shaft 15 is transmitted to shaft 38 by means of a sprocket chain or belt 39. It is evident from Figures 5 and 6 that the invention that has been applied to the mechanism shown in Figures 1, 2, 3 and 4 can be applied to machines of specifically different constructions and therefore it is not limited to any specific machines, but is useful wherever two cooperating machines that are normally operated from separate engines are of such a nature or operate in such a manner that machine B may slow down due to an overload whereupon the engine by which it is operated will automatically receive additional power from the other engine.

It is, of course, necessary to start engine EB and this is effected manually in machines having an engine for operating the mechanism. With the mechanism described above, the tractor engine, or engine EA serves as a starter for engine EB. It is evident that the clutch becomes effective to start engine EB whenever the power takeoff shaft is rotated; this is an important consideration in machines of the type to which this invention relates.

Having described the invention what is claimed as new is:

1. Farming apparatus comprising; a farming implement, an engine driven tractor connected to the farming implement in a manner to move it over the ground, the tractor having a power take off from the tractor engine, a harvesting device carried by the farming implement, a shaft rotatably carried by the farming implement, power transmission means operatively connecting the shaft and the harvesting device, power transmission means operatively connecting the power take off and the shaft, the harvesting device receiving all of its power and being driven at all times only by the tractor engine, an auxiliary internal combustion engine carried by the farming implement, a harvested material handling device carried by the farming implement, power transmission means operatively connecting the auxiliary engine and the harvested material device for normally operating it solely by the auxiliary engine, power transmission means for connecting the rotatable shaft to the harvested material device including overrunning clutch means adapted to automatically connect the shaft and the harvested material handling device and assist in driving the latter by the shaft only when the auxiliary engine tends to slow down due to overload on the harvested material treating device, both engines contributing power to drive the harvested material treating device during the overload.

2. Farming apparatus in accordance with claim 1 wherein the farming implement is disposed behind the tractor and is adapted to be towed thereby by a connection permitting relative lateral swinging movement between the tractor and farming implement, and the power take off the rotatable shaft are connected by a rotatable and extensible shaft adapted to transmit power in any position of the lateral swinging movement.

3. Farming apparatus in accordance with claim 2 wherein the rotatable and extensible shaft is provided with universal joints at its ends.

PETE CORSENTINO.

REFERENCES CITED

The following references are of record in the file of this patent:

UNITED STATES PATENTS

| Number | Name | Date |
|---|---|---|
| 1,117,460 | Spangler | Nov. 17, 1914 |
| 1,862,999 | Ball | June 14, 1932 |
| 1,990,810 | Young | Feb. 12, 1935 |
| 2,016,934 | Smith | Oct. 8, 1935 |
| 2,112,430 | Tholl | May 29, 1938 |
| 2,167,676 | Pechy | Aug. 1, 1939 |
| 2,212,465 | Baldwin | Aug. 20, 1940 |
| 2,243,156 | Howe et al. | May 27, 1941 |
| 2,282,597 | Archer | May 12, 1942 |
| 2,397,613 | Dadren et al. | Apr. 2, 1946 |
| 2,419,811 | Beall | Apr. 29, 1947 |